March 1, 1960     A. J. SHERMAN     2,926,431
LIFT COMPUTING SYSTEM FOR AIRCRAFT TRAINER
Filed Jan. 13, 1958
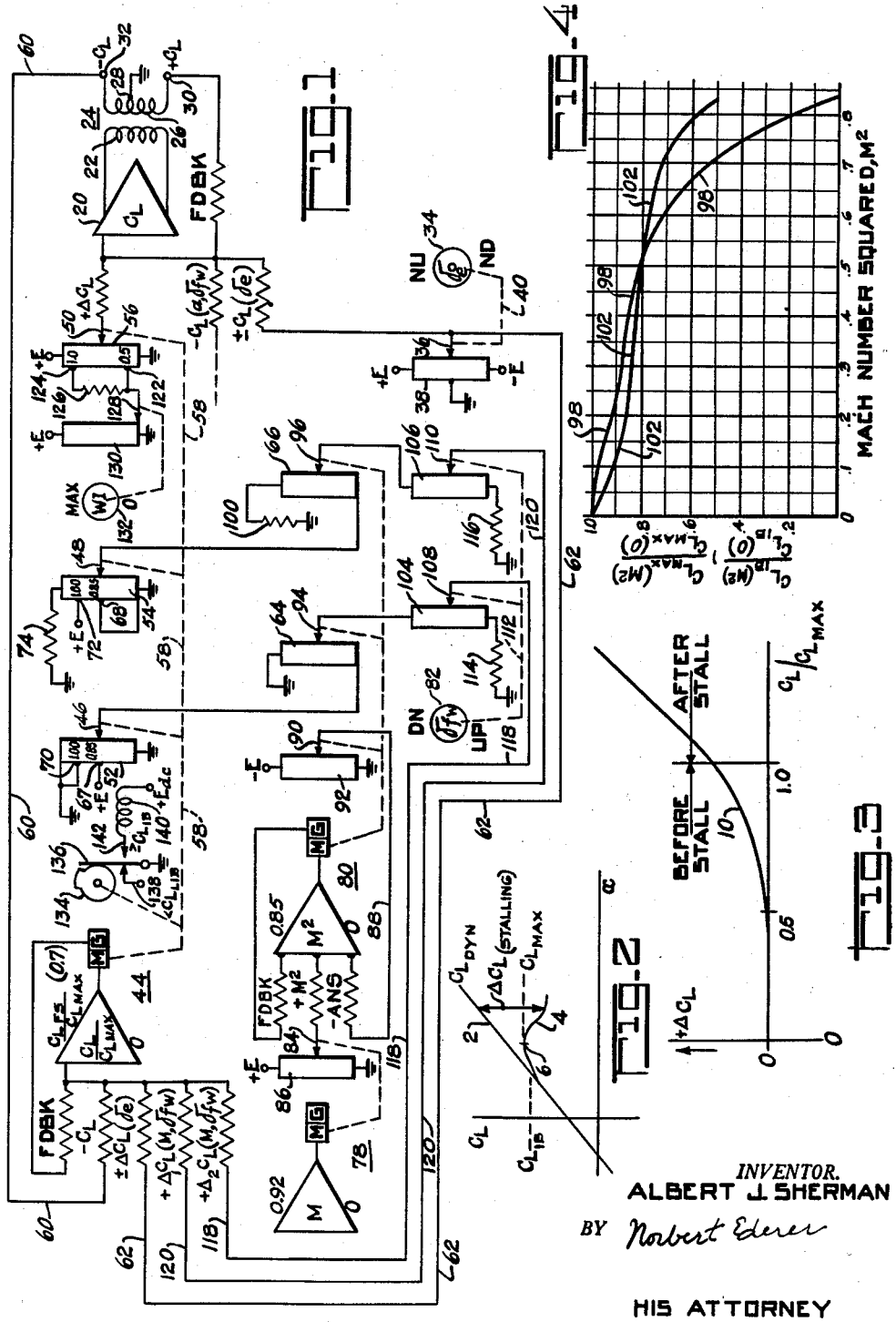
INVENTOR.
ALBERT J. SHERMAN
BY Norbert Ederer
HIS ATTORNEY

United States Patent Office 2,926,431
Patented Mar. 1, 1960

2,926,431

LIFT COMPUTING SYSTEM FOR AIRCRAFT TRAINER

Albert J. Sherman, Morris Plains, N.J., assignor to Curtiss-Wright Corporation, a corporation of Delaware Application January 13, 1958, Serial No. 708,625

7 Claims. (Cl. 35—12)

This invention relates to flight computing systems in grounded aircraft trainers, and more particularly to improved apparatus for the computation of the coefficient of lift of the simulated flight.

Lift computation is disclosed by the prior art, an example being shown in a pending application of mine and of R. G. Stern for "Flight Computing Systems," S.N. 436,532, filed June 14, 1954, now Patent No. 2,858,632, granted on November 4, 1958. The computation of coefficient of lift as heretofore accomplished has been based upon approximations which, although sufficient for many applications, are inadequate for purposes of a high degree of realism in simulation of actual flight conditions. The lack of realism becomes particularly pronounced at large angles of attack as the conditions of aircraft stalling are approached and reached.

From basic aerodynamic theory it is known that the coefficient of lift ($C_L$) is a function principally of angle of attack ($\alpha$). This function is composed of so-called aerodynamic terms and of stalling terms. At low angles of attack, stall terms are negligible and the variation of $C_L$ vs. $\alpha$ is approximately linear. As $\alpha$ is increased a point of initial buffeting or stall warning is reached as induced by the spilling of air over portions of the wing of an actual aircraft. The buffeting effect is transmitted to the tail end as such produces tail shake or stick shake. It is at this point that the stall terms become appreciable and effect leveling off of the $C_L$ vs. $\alpha$ relation with increasing $\alpha$ until a maximum point is reached; thereafter $C_L$ decreases with further increase of $\alpha$ in the region of stall. The spilling of air associated with the onset of buffeting may result in rolling and in loss of control by the pilot and consequent crash on take-off or landing. As the stall is approached, the flow of air is changed from aerodynamic flow to a stall flow due to viscous effects. This results in a leveling off and ultimately in a drop of $C_L$ with increasing $\alpha$ as stated, and may diminish the effect of the aileron controls.

Heretofore the computation of various aerodynamic characteristics dependent on $C_L$ in the region of stall flow has posed serious problems requiring complicated circuitry because of variations in $C_L$ at stalling due to factors such as wing-flap deflection, thrust, Mach number and so forth. Moreover in the computation of $C_L$ heretofore the dynamic relations of $C_L$ and $\alpha$ have been ignored. As $\alpha$ is increased suddenly into the region of stall flow, initially $C_L$ will follow the previously applicable approximately straight line aerodynamic variation. After some time delay the value of $C_L$ will drop to lower value dictated by the conditions of stall flow. Heretofore the transition from the region of aerodynamic flow to the region of stall flow has been direct, i.e. without the required time delay. The computed $C_L$ signal controls computation of aerodynamic factors determinative of the simulated flight; the absence of proper time lag in computed $C_L$ is reflected in a dynamically inaccurate computation of aerodynamic factors with a resultant simulation that is not too highly realistic.

Accordingly it is an object of the invention to provide a lift coefficient computing system which accurately reflects the proper dynamic variation of lift coefficient with angle of attack.

Another object of the invention is to provide lift computing apparatus in which $C_L$ is accurately computed in the stall region without resort to complex function generation.

These and other objects are attained in accordance with the invention by separate computation of the stall terms and by computation of these terms not as a function of $\alpha$ directly, but as a function of $C_L$ in the form of the variable $C_L/C_{L_{MAX}}$, where $C_{L_{MAX}}$ is the maximum value of $C_L$ in the plot of $C_L$ vs. $\alpha$, i.e. the value attained at the instant of stall just before the value of $C_L$ drops with further increase in $\alpha$. With the computation of the stall terms as a function of $C_L/C_{L_{MAX}}$ rather than of $\alpha$ the problems of function generation are greatly simplified so that it is possible to employ potentiometers of easily realizable contour in the apparatus.

The invention will be more fully set forth in the following description referring to the accompanying drawing, and the features of novelty will be pointed out with particularity in the claims annexed to and forming a part of this specification.

In the drawing:

Fig. 1 is a schematic representation of the coefficient of lift computing circuitry in accordance with a preferred embodiment of the invention;

Fig. 2 is a graphical representation of a typical variation of $C_L$ vs. $\alpha$;

Fig. 3 is a graphical representation of a typical variation of the decrement in coefficient of lift ($\Delta C_L$), required to be subtracted from the aerodynamic relation to obtain the proper stall flow relation, plotted as a function of $C_L/C_{L_{MAX}}$; and Fig. 4 is a graphical representation indicating a typical variation in the values of $C_{L_{MAX}}$ and $C_{L_{IB}}$ (coefficient of lift at the point of initial buffet) with $M^2$ (Mach number squared).

The invention will be understood in a general way by reference first to Figs. 2 and 3. In Fig. 2 there is shown the approximately straight line aerodynamic relation of $C_L$ with $\alpha$ designated by reference numeral 2. The complete relation of $C_L$ with $\alpha$, i.e. the composite of aerodynamic and stall flow terms, is indicated by reference numeral 4 and as shown is in fact the same as the aerodynamic relation up to a value of $C_L$ somewhat below the initial buffeting point $C_{L_{IB}}$. Thereafter the stall terms become effective and curve 4 levels off until a maximum ($C_{L_{MAX}}$) is reached at the point of stalling 6, whereafter the curve 4 diminishes in value with increasing $\alpha$. The apparatus represented in Fig. 1 is intended to compute the aerodynamic relation indicated by the line 2 and to subtract therefrom the proper decrement $\Delta C_L$ to arrive at the complete $C_L$ vs. $\alpha$ characteristic represented by the curve 4. The decrement $\Delta C_L$ in accordance with the invention is computed with $C_L$ or more accurately with $C_L/C_{L_{MAX}}$ rather than $\alpha$ as the independent variable as indicated by the curve 10 in Fig. 3. The curve 10 has an initial portion which is substantially zero up to a value of $C_L$ approximately one half of $C_{L_{MAX}}$. Thereafter the curve increases approximately parabolically up to the stall point $C_{L_{MAX}}$, and thence increases approximately linearly up to the point of full stall $C_{L_{FS}}$. By virtue of the computation of $\Delta C_L$ with reference to $C_L/C_{L_{MAX}}$ rather than $\alpha$ it is possible to employ "linear" potentiometers (i.e., having uniform contour) throughout the apparatus except for the potentiometers required for producing the Mach number effects. Even the latter are of relatively easily realizable contour.

Referring to Fig. 1 there is shown a first summing or combining amplifier 20 which computes coefficient of lift $C_L$ in accordance with several A.C. input signals hereinafter specified. The $C_L$ amplifier performs the function of the like-named amplifier indicated in the above-mentioned Patent Number 2,858,623. The $C_L$ amplifier of this patent accepts a plurality of input or control signals, of which only one, namely the input signal $-C_L$ ($\alpha$, $\delta_{fw}$) is utilized in the apparatus of the present invention. This first control signal is provided by or derived through a resistor labeled $-C_L$ ($\alpha$, $\delta_{fw}$) in the presently described apparatus and also in the patent. The means additional to the resistor for deriving the signal in the apparatus of the present invention are the same as those of the patent, and are therefore not shown. As described in the patent, the signal is a joint function of primarily computed angle of attack and secondarily of the position of a wing flaps control. The wing flaps control is additionally employed in the apparatus of the present invention as described hereinafter. The $C_L$ amplifier of the patent is provided with an output transformer which supplies other circuits in the apparatus of the patent. The $C_L$ amplifier of the present invention is also provided with an output transformer to which such circuits may be connected for reception of a $C_L$ signal of higher dynamic realism than is available from the apparatus of the patent. In this manner the entire computing system disclosed in Fig. 1 may be readily integrated into the flight computing system disclosed in Patent Number 2,858,623. The various summing amplifiers, servo amplifiers, servo motors, feedback generators, potentiometers, etc., employed herein function in a manner fully disclosed in Patent Number 2,858,623, and the symbolic representation used therein is also incorporated in the present application, rendering a detailed description unnecessary.

The amplifier 20 delivers its output voltage to a primary 22 of a transformer 24 whose secondary 26 is provided with a grounded center tap 28 and with end terminals 30 and 32 at which the voltages $+C_L$ and $-C_L$ are available for utilization in the remainder of the flight computing apparatus disclosed in Patent Number 2,858,623. The voltages $+C_L$ and $-C_L$ reflect the computed composite coefficient of lift including both hydrodynamic and stalling terms, are of equal magnitude, and are respectively in phase and in phase opposition to a reference A.C. voltage $+E$ which is employed to energize various potentiometers as indicated hereinafter. An A.C. reference voltage $-E$ which is of the same magnitude but in phase opposition to the voltage $+E$ is also utilized for energization of potentiometers. The remaining signal voltages referred to hereinafter are in phase with one or the other of the reference voltages $+E$ and $-E$ as indicated by the associated sign.

The amplifier 20 is provided with input signals $-C_L$ ($\alpha$, $\delta_{fw}$), $+\Delta C_L$ and $\pm C_L$ ($\delta_e$) which are applied through respective summing resistors to the amplifier and represent the contributions to composite $C_L$ due respectively to the aerodynamic terms, to stalling terms decrement, and the position of the elevator. The arrangement is such that an increasingly negative signal reflects increasing coefficient of lift. As previously stated, the input signal $-C_L$ ($\alpha$, $\delta_{fw}$) may be derived as shown in the aforesaid Patent Number 2,858,623 and incorporates the effects on $C_L$ of angle of attack $\alpha$ and also of wing flaps position. The input signal $\pm C_L$ ($\delta_e$) is in accordance with the position of an elevator control 34 which operates from a neutral position to the limits of "nose up" and "nose down." A slider 36 of a linear potentiometer 38 is connected to the control 34 as indicated at 40. The potentiometer 38 is energized at its "nose up" end by the reference voltage $+E$, is grounded at its center corresponding to the neutral position of control 34, and is connected at its "nose down" end to the voltage $-E$. The slider 36 is tied to the input $\pm C_L$ ($\delta_e$). Accordingly as the control 34 is displaced from neutral in the "nose up" direction a linearly increasing voltage of positive reference phase is applied to the input tending to reduce coefficient of lift. As the slider 36 is positioned in the "nose down" direction a voltage increasing in magnitude linearly at the same rate but of negative phase is applied to the input $\pm C_L$ ($\delta_e$).

The input signal $+\Delta C_L$ is generated in accordance with the position of a $C_L/C_{L_{MAX}}$ computing servo 44 which computes the stall function contribution in the $C_L$ signal as ultimately computed by amplifier 20. The servo 44 operates from a lower limit position of zero corresponding to a $C_L$ of zero, to a position corresponding to maximum $C_L$ as indicated at 6 in Fig. 2, and thence decreasing to some value such as 0.7 $C_{L_{MAX}}$ corresponding to full stalling at the upper limit. The operation of servo 44, and for that matter of the other servos used herein, is in the manner of the aforesaid Patent Number 2,858,623; for simplicity the associated servo motor-velocity feedback generator combination is designated by the letters MG enclosed in a rectangle. The servo gang-operates sliders 46, 48 and 50 of linear potentiometers 52, 54 and 56 respectively through connections generally indicated as at 58, which connections include suitable gear reduction as shown in the Patent Number 2,858,623. The servo 44 sums or combines the following input signals; the usual velocity feedback signal FDBK, an input signal $-C_L$ derived over line 60 from the output terminal 32 of transformer 24, an input signal $\pm \Delta C_L$ ($\delta_e$) derived over line 62 from the slider 36 previously referred to, one answer signal $+\Delta_1 C_L$ (M, $\delta_{fw}$) that is ultimately derived from the one answer signal deriving slider 48, and a second answer signal $+\Delta_2 C_L$ (M, $\delta_{fw}$) that is ultimately derived from the second answer signal deriving slider 46. The arrangement is such that an increasingly negative signal tends to position the sliders 46 etc. increasingly upward.

The input signal $-C_L$ by reason of its derivation from the final output stage of the computing system represents composite $C_L$ including both aerodynamic and stall terms. Owing to the application of the signal $\pm C_L$ ($\delta_e$) to the amplifier 20 a contribution due to elevator position is inherent in the signal $-C_L$; for correct computation of the $\Delta C_L$ increment a second contribution due to elevator position is applied to the input $\pm \Delta C_L$ ($\delta_e$) of the servo 44. Moreover, as will be seen hereinafter for $C_L/C_{L_{MAX}}$ in excess of 0.5 the $-C_L$ signal contains a contribution due to the operation of servo 44; therefore the signal is in part an answer type signal.

The principal answer input signals to the servo 44 originate at the wipers 46 and 48. The resort to two answer potentiometers 52 and 54 rather than to a single answer potentiometer is for reason of convenience in computation and permits simple contouring for the two Mach number potentiometers 64 and 66 whose lower ends are respectively connected to the sliders 46 and 48. The potentiometers 52 and 54 as well as the third $C_L/C_{L_{MAX}}$ potentiometer 56 are grounded at respective lower ends. The respective sliders engage these lower ends in the zero position of servo 44. The potentiometer 52 is energized by the voltage $+E$ at a tap point 67 corresponding to a $C_L/C_{L_{MAX}}$ ratio of .85, i.e. at the point of initial buffet. The potentiometer 54 is provided with a corresponding tap point 68 which is short-circuited to the lower end of potentiometer 54. As a result as the servo 44 moves from its zero position to initial buffet, the voltage on slider 46 will increase linearly from zero to $+E$ whereas the voltage on slider 48 will remain at ground potential. The potentiometer 52 is provided with a second tap point 70 and the potentiometer 54 is provided with a corresponding tap point 72. These second tap points correspond to a $C_L/C_{L_{MAX}}$ ratio of unity, i.e. the stall point 6. The tap point 70 is short-circuited to the grounded upper end of potentiometer 52 whereas the tap point 72 is energized by the reference voltage $+E$. The upper end of potentiometer 54 is connected to ground through voltage dividing resistor 74. By reason of the specified connections, as the servo 44 advances from the point of initial buffet to the stall point, the wiper 46 will move from the tap point 67 to the tap point 70 and derive a voltage decreasing linearly from $+E$ to zero whereas the wiper 48 will move from the tap point 68 to the tap point 72 and will derive a voltage increasing linearly from zero to $+E$ at the same rate. Above the stall point the derived voltage at slider 46 remains at zero, whereas the derived voltage at the wiper 48 will decrease to a minimum positive value at the full stall point corresponding to the upper end of potentiometer 54, as determined by the voltage division between portion of the potentiometer 54 above tap point 72 and resistor 74.

The summation of the signals to the wipers 46 and 48 represents the proper answer signal to effect conversion of the signal $-C_L$ at the input side of the servo 44 to $C_L/C_{L_{MAX}}$ as reflected by the servo position on its output side, assuming zero Mach number and a neutral wing flaps position. The effects of varying Mach number and varying wing flaps position on the computation of $+\Delta C_L$ are introduced by modifying the voltages derived at the sliders 46 and 48 in accordance with the operation of a Mach number (M) servo 78, more directly according to the operation of a Mach number squared ($M^2$) servo 80, and a wing flaps control 82. The wing flaps control is determinative also of the input signal $-C_L$ ($\alpha$, $\delta_{fw}$) to the amplifier 20 as shown in the aforesaid Patent Number 2,858,623.

The M servo 78 may be controlled as shown in U.S. Patent No. 2,784,501 granted to Stern et al. on March 12, 1957. The servo operates between the indicated lower and upper limits of 0 and 0.92 respectively and gang-operates a slider 84 of a potentiometer 86 which is connected at its lower and upper ends respectively to ground and to the voltage $+E$ and is a square function potentiometer, i.e. with a resistance distribution increasing linearly from its lower to its upper end. Accordingly an $M^2$ voltage is derived at the slider 84 and provides the lone external input signal to the $M^2$ servo 80. The servo is provided with the usual velocity feedback signal FDBK and with the usual answer signal $-$ANS which is derived over line 88 from the slider 90 of a linear answer potentiometer 92 that is connected at its lower and upper ends to ground and to the voltage $-E$ respectively. Servo 80 operates between the indicated lower and upper limits of 0 and 0.85 respectively.

In addition to the slider 90 the servo gang-operates also the sliders 94 and 96 of the potentiometers 64 and 66 respectively. The potentiometer 64 is supplied at its lower end by the voltage derived from the slider 46 as previously stated and is grounded at its upper end. It is contoured for derivation at its slider 94 for the generation of the ratio $C_{L_{IB}}(M^2)/C_{L_{IB}}(M=0)$, i.e. the ratio of $C_{L_{IB}}$ at any given Mach number squared to $C_{L_{IB}}$ at the Mach number of zero as indicated by the curve 98 in Fig. 4. The contour of card 64 is the derivative of the curve 98. The potentiometer 66 is energized at its lower end by the voltage derived by the wiper 48, is returned to ground at its upper end through a voltage dividing resistor 100 and is contoured for derivation at its slider 96 of the function $C_{L_{MAX}}(M^2)/C_{L_{MAX}}(0)$, i.e. the ratio of $C_{L_{MAX}}$ at a given Mach number squared to the value of $C_{L_{MAX}}$ at a Mach number of zero as reflected by the curve 102 in Fig. 4. The contour of the card 66 is the derivative of the curve 102. In the upper extreme position of $M=0.92$ and therefore $M^2=0.85$ the voltage derived at wiper 94 is zero; at the same time however the voltage at the wiper 96 is limited to approximately 50% of its value at $M=0$ owing to the voltage division between the card 66 and resistor 100.

By reason of the operation of the sliders 94 and 96 by the $M^2$ servo 80 the voltages derived respectively at said sliders are multiplied by function of $M^2$ as represented by the curves 98 and 102 respectively; by reason of introduction of such multiplication in the answer loops of the servo 44 the modification of the principal input signal $-C_L$ to the servo 44 is however in the nature of division rather than multiplication of the $-C_L$ signal. If the signal $-C_L$ had been modified in accordance with M or $M^2$ in its direct input path generation reciprocal functions of the functions 98 and 102 would have been necessary and would have required more complicated potentiometer contours. The derivation of the voltages at the wipers 94 and 96 as a function of $M^2$ rather than of M, as well as the selection of two rather than one answer loops likewise simplifies the contouring of the potentiometers.

The reasons for modification of the $-C_L$ signal in the answer loops apply also to the modification of the signal in accordance with wing flaps position permitting selection of linear $\delta_{fw}$ potentiometers 104 and 106, whose respective wipers 108 and 110 are gang-operated with the wing flaps control 82 by means of connections indicated as at 112. The potentiometers have their upper ends connected respectively to the sliders 94 and 96 and have their lower ends returned to ground through resistors 114 and 116 respectively. The control 82 is operable from a neutral position to a "down" position wherein the sliders 108 and 110 engage the upper ends of their respective potentiometers and also to an "up" position wherein the sliders engage respective lower ends. Accordingly as the wipers are positioned from the "down" position to the "up" position the voltages thereon decrease linearly from the maximum voltages available at the upper ends of the respective potentiometers to respective minima as governed by the voltage division due to the resistors 114 and 116. The wipers 108 and 110 are connected over respective lines 118 and 120 to the principal answer inputs $+\Delta_1 C_L(M, \delta_{fw})$ and $+\Delta_2 C_L(M, \delta_{fw})$ of the servo 44.

The $+\Delta C_L$ input voltage to the $C_L$ amplifier 20 is derived from the slider 50 of the linear card 56 of the servo 44 as a further signal produced by the servo 44 in addition to the two answer signals. The signal $+\Delta C_L$ represents the stall function contribution in the $C_L$ signal as ultimately computed by amplifier 20. Card 56 is connected at its lower and upper ends to ground and to the voltage $+E$ respectively, as previously stated. The card 56 is provided with a pair of tap points 122 and 124 which correspond to $C_L/C_{L_{MAX}}$ ratios of 0.5 and unity respectively. A resistor 126 is connected across the tap points 122 and 124. Tap point 122 is tied to a slider 128 of a linear potentiometer 130 that is connected at its lower and upper ends to ground and to the voltage $+E$ respectively. The slider 128 is gang-operated with an instructor's wing ice control knob 132 which is operable from a position corresponding to no wing ice to a position of maximum wing ice, the slider 128 assuming the lower and upper end positions of the card 130 respectively.

Assuming that no wing ice is present, the slider 128 and therefore the tap point 122 are grounded. Inasmuch as the lower end of the potentiometer 56 is also grounded, as $C_L/C_{L_{MAX}}$ rises from 0 to 0.5 the slider 50 moves from the lower end of card 56 to the tap point 122, the input signal $+\Delta C_L$ to the amplifier 20 is zero over this range and accordingly the voltages at the terminals 30 and 32 follow the aerodynamic relation indicated by the plot 2 in Fig. 2. As $\alpha$ increases, the input signal $-C_L$ ($\alpha$, $\delta_{fw}$) increases instantly according to the aerodynamic relation. As a result the signals at the output terminals 30 and 32 also increase instantly. The application of the increased $-C_L$ voltage from the terminal 32 to the input of the servo 44 however effects movement of the servo so that the slider 50 will be positioned upward of the tap point 122 and an increasingly positive signal will be derived from the wiper 50 reducing the output signal $-C_L$ (and for that matter the output signal $+C_L$) until these signals assume the appropriate values dictated by the composite curve 4. The servo 44 responds initially rapidly to the change in the $-C_L$ ($\alpha$, $\delta_{fw}$) input voltage, but subsequently its rate of movement is decreased owing to the continued decrease of the $-C_L$ voltage occasioned by the very movement of the servo 44. Accordingly there is a time lag in the transition of the $C_L$ voltage from its initial aerodynamic flow value to its final stall flow value occasioned by the relative slowness of the servo 44, due inherently in servo operation and also to the continued decrease of the $C_L$ voltage. In this manner the dynamic change of the $C_L$ voltage and also the rate of such change from aerodynamic to stall flow are correctly reflected.

Owing to the provision of the shunting resistor 126 the relation of the voltage on wiper 50 with displacement is not linear but approximately parabolic between the tap points 122 and 124 as indicated in the curve 10 in Fig. 3 between the values of 0.5 and 1.0 $C_{L_{MAX}}$. Above the tap point 124 the derived voltage increases linearly towards the maximum voltage of $+E$ as also reflected in Fig. 3.

The effects due to change in position of the controls 34 or 82 are similar. Thus if the elevator control 34 is positioned towards the "nose down" position a more negative signal will be applied to the input $\pm C_L$ ($\delta_e$) of amplifier 20 immediately increasing the output voltage at the terminals 30 and 32. Application of the changed output voltage at the terminal 32 at the $-C_L$ input of amplifier 44 subsequently causes the servo to move upward so that after some time delay the output voltages at the terminals 30 and 32 are reduced again. The converse is true with a change in position of the control 34 towards its "nose up" position. In a similar manner a change in position of the wing flaps control is reflected by an immediate change in the input voltage $-C_L$ ($\alpha$, $\delta_{fw}$) to the amplifier 20 as shown in the aforementioned Patent Number 2,858,623. The servo 44 subsequently responds to the change in position of the sliders 108 and 110 and produces a change in the input signal $+\Delta C_L$ to amplifier 20 of a direction tending to reduce the change in output voltage of amplifier 20 occasioned by the initial change in position of the control 82.

With the wing ice control 132 set to represent a non-zero wing ice condition, the operation is further modified in that the input signal $+\Delta C_L$ to the amplifier 20 increases with a change in the position of the servo 44 even between its 0 and 0.5 positions. In the limit as the slider 128 is positioned at the upper end of the card 130 corresponding to maximum wing ice the full voltage $+E$ is applied to the tap 122 and produces a decrement in $C_L$ of the same effect as though the slider 150 were positioned at the upper of the card 56. Thus increased wing ice is effective to reduce coefficient of lift as expected.

The servo 44 gang-operates through connections 58 several cams of which the cam 134 is typical. The cam 134 engages a movable grounded contact 136 which in the indicated position corresponding to $C_L < C_{L_{IB}}$ engages a fixed contact 138 thereby maintaining an initial buffet relay 140 deenergized. When the initial buffeting point is attained the contact 136 is transferred to engage an alternate fixed contact 142 completing an energization circuit for relay 140 from the positive direct voltage $+E_{dc}$ through the relay coil, contacts 142 and 136 to ground. The relay 140 is provided with one or more contacts which upon energization of the relay are transferred to complete circuits for the simulation of initial buffeting effects. Such simulating circuits however form no part of the present invention and therefore are not shown. Other cams similar to the cam 134 determine the state of deenergization or energization of stall warning or crash landing relays similar to the relay 140 whose contacts in turn actuate stall warning or crash simulation circuitry, again forming no part of the invention and therefore not shown.

It should be understood that this invention is not limited to specific details of construction and arrangement thereof herein illustrated, and that changes and modifications may occur to one skilled in the art without departing from the spirit of the invention.

What is claimed is:

1. In a flight computing system for grounded aircraft trainers providing a first control signal representing computed coefficient of lift of the simulated aircraft in flight as the aerodynamic function of angle of attack, a system for accurately computing the coefficient of lift to include combined aerodynamic and stall functions comprising a first summing amplifier controlled according to said control signal for producing the ultimately desired output signal representing said combined functions, a servo summing amplifier and a servomotor positionable in accordance with the summation of the input signals to said servo summing amplifier, signal producing means having at least two sliders positionable by said servomotor for deriving from said sliders respectively at least one answer signal and a further signal representing said stall functions, means to apply said one answer signal as an answer input signal to said servo summing amplifier, means to apply said further signal as a decremental stall function signal to the input of said first summing amplifier, and means to apply said output signal as an input signal to said servo summing amplifier, whereby when said first signal is changed, said output signal changes initially substantially solely to follow said first signal in accordance with said aerodynamic function and changes subsequently to follow said further signal in accordance with said stall function, said subsequent change being occasioned by reason of said servomotor responding relatively slowly to said output signal changes.

2. Apparatus as specified in claim 1, wherein the answer signal slider derives in accordance with the servomotor position a signal which increases from a minimum corresponding to a condition of zero coefficient of lift to a maximum corresponding to coefficient of lift associated with initial buffeting, thence decreases to a minimum corresponding to maximum coefficient of lift, and thence remains constant at the latter minimum corresponding to a range of from said maximum coefficient to a final stall coefficient, and wherein the signal producing means is provided with a second answer signal deriving slider and means to apply the latter derived signal as a second answer input signal to the servo summing amplifier, said second slider deriving in accordance with the servomotor position a signal that is constant at a minimum corresponding to the range of from zero to initial buffeting lift coefficient, thence increases to a maximum corresponding to said maximum coefficient, and thence decreases to a predetermined value corresponding to said final stall coefficient.

3. The combination as defined in claim 1, further provided with a simulated wing flaps control, and means to modify the aforesaid one answer signal in accordance with the position of said wing flaps control.

4. The combination as defined in claim 1 wherein the flight computing system includes means for computing Mach number of the simulated flight, further provided with means to modify the aforesaid one answer signal in accordance with computed Mach number.

5. The combination as defined in claim 1 further provided with a simulated elevator control, and means to apply a signal to an additional input of each of the aforesaid summing amplifiers in accordance with the position of said elevator control.

6. The combination as defined in claim 1 with the inclusion of a simulated wing ice control, and means for modifying the aforesaid further signal in accordance with the position of said wing ice control.

7. In a flight computing system for grounded aircraft trainers providing a first control signal representing computed coefficient of lift of the simulated flight as the aerodynamic function of angle of attack, a system for accurately computing the coefficient of lift to include combined aerodynamic and stall functions, comprising relatively rapidly responsive computing means controlled according to said first control signal for producing the ultimately desired output signal representing said combined functions, relatively slowly responsive computing means for computing said stall functions, means to apply an output signal of said slowly responsive computer as a decremental stall function signal to the input of said rapidly responsive computer, and means to apply said ultimately desired output signal as an input signal to said slowly responsive computer to effect said stall function computation by the latter, whereby when said first control signal is changed, said ultimately desired output signal changes initially substantially solely to follow said first control signal in accordance with said aerodynamic function and changes subsequently in accordance with said stall function signal, said subsequent change being occasioned by reason of said slow response.

References Cited in the file of this patent

UNITED STATES PATENTS

| | | |
|---|---|---|
| 2,556,964 | Giroud | June 12, 1951 |
| 2,731,737 | Stern | Jan. 24, 1956 |
| 2,784,501 | Stern et al. | Mar. 12, 1957 |
| 2,803,893 | Stern | Aug. 27, 1957 |